Figure 1:
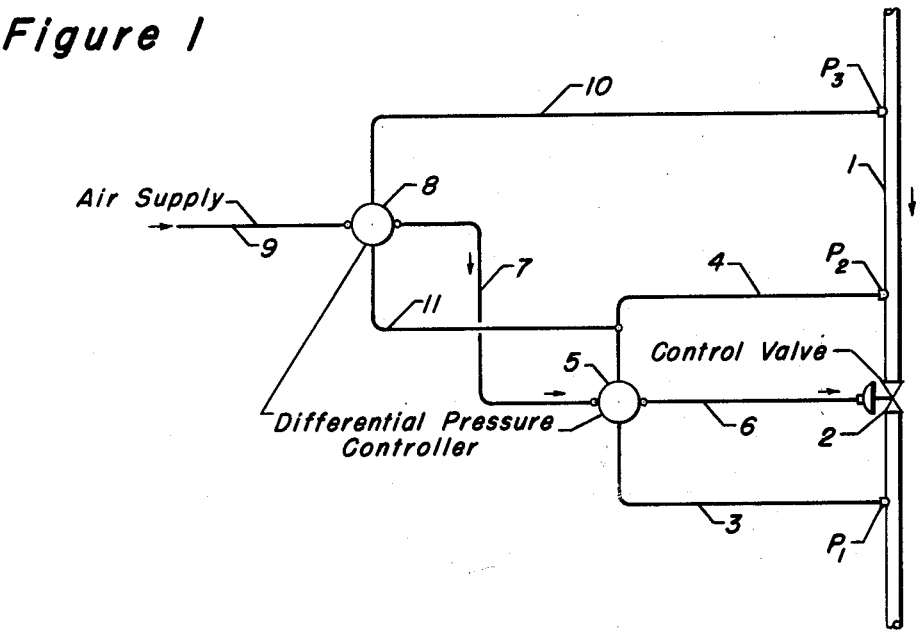

April 7, 1964  L. O. STINE ETAL  3,128,129
CONTROL OF CATALYST CIRCULATION RATE IN A FLUIDIZED SYSTEM Filed June 26, 1961

INVENTORS:
Laurence O. Stine
Norman H. Scott
BY: *Chester J. Giuliani*
*Philip T. Liggett*
ATTORNEYS

United States Patent Office 3,128,129
Patented Apr. 7, 1964

3,128,129
CONTROL OF CATALYST CIRCULATION RATE
IN A FLUIDIZED SYSTEM
Laurence O. Stine, Western Springs, and Norman H. Scott, Berwyn, Ill., assignors to Universal Oil Products Company, Des Plaines, Ill., a corporation of Delaware
Filed June 26, 1961, Ser. No. 119,525
8 Claims. (Cl. 302—35)

The control system of the present invention provides means for regulating the flow of subdivided solid particles in a fluidized system and more particularly provides a control arrangement which integrates pressure differential measurements at selected points in the system to regulate the circulation of the solid particles and insure the flow thereof in a desired direction.

Fluidized contacting systems, such as, for example, the fluidized catalytic cracking of gas oils in petroleum refinery operations, are now widely known and need not be described in detail herein. Generally, control of the catalyst circulation rate is effected by the automatic regulation or control of one or more power operated slide valves in the transfer conduits extending between the contacting chambers. Also, it has been generally preferable to maintain fluidized contacting operations at relatively low superatmospheric pressures so as to minimize apparatus and operating expenses in carrying out the particular conversion process. The fluidized operation has, of course, been utilized widely for various types of petroleum and petrochemical processes other than catalytic cracking, as, for example, in connection with coking, reforming, ethylene production, hydrogen production, and the like.

The present control system is applicable to any fluidized processing operation. However, it is particularly effective in connection with fluidized operations where there is an overhead transfer of the fluidized phase from a contacting zone, or zones, such that there is a subsequent separation of subdivided particles outside of the contacting chamber and a resulting column of particles descending in a relatively dense or compact phase through flow restricting means and through transfer conduit means to another contacting zone of the system. In other words, the present control system is adapted for incorporation in an operation that does not readily provide for the conventional use of a level control, or an equivalent means, to operate in conjunction with a dense phase level within a contacting chamber or storage zone. In conventional fluidized systems that maintain dense phase and light phase conditions in each zone, the circulation rate may be regulated by a measurement of the level of the dense phase bed of particles in a particular zone and then controlling the rate of withdrawal therefrom responsive to such level. Circulation rates may also be regulated responsive to temperature variations, as, for example, variations in temperature in the reaction zone may automatically regulate the flow of hot regenerated catalyst from the regeneration zone, i.e., the slide valve in the transfer line therefrom is regulated responsive to the temperature requirements in the reaction zone.

It is a principal object of the present invention to provide for the control of a subdivided solid particle circulation rate in a continuous system by the integration of two different differential pressure systems operating in conjunction with a control valve in a catalyst standpipe extending from one of the contacting zones of the system.

It is also an object of the present invention to provide a control system which combines a measurement of the pressure drop or density of the dense phase existing above a flow control valve in the catalyst transfer conduit together with a pressure differential measurement taken across the valve itself, so as to regulate particle flow at a desired rate and in a desired direction as well as insure flow of sufficiently dense solid-fluid mixture.

It is a still further object of the present invention to provide a catalyst circulation control arrangement wherein two pressure differential systems combine with two separate differential pressure controllers and the motive power means to the regulating valve means such that one differential pressure arrangement serves as a primary adjustment means and the other pressure differential arrangement serves in a secondary manner precluding gas or dilute phase flow downwardly through the standpipe, or reversals of flow through said regulating valve or restriction.

In a broad aspect, the present invention provides in combination with a fluidized processing system wherein subdivided solid material is continuously circulated from a first contacting zone to a second contacting zone and from the latter back to the first zone and wherein the subdivided material is collected in a relatively dense compact phase in a confined column thereof after contact in one zone and prior to transfer to the other zone through an adjustable restriction in such column, the improved method of controlling the circulation rate of the material which comprises, measuring variations in the pressure drop of the solid material phase existing just above the restriction, at the same time measuring the differential pressure across the restriction and continuously controlling and adjusting the flow of the solid material through said system responsive to the combination of both the pressure differential measure occurring across the restriction and to the pressure drop measurement above the restriction.

In another embodiment, the present invention provides in combination with a fluidized processing system wherein the subdivided solid material is collected in a relatively dense phase state within a confined column thereof after contact in one zone and prior to transfer through an adjustable restriction to another zone, the improved method of controlling the circulation rate in the system in a manner which comprises, measuring the density of the solid material phase at a level just above the flow restriction, further measuring the differential pressure across the adjustable restriction in column, effecting the continuous incremental adjustment of the adjustable restriction and of the circulation rate of the material in the system directly responsive to variations in the pressure differential across said restriction and simultaneously providing in combination therewith a secondary automatic control of adjustment of said adjustable restriction and the circulation rate responsive to the measurements of density in the dense or compact phase above the restriction whereby to preclude dilute phase flow downwardly through the restriction.

In another specific embodiment, the present invention provides for controlling the circulation rate of the solid material in a fluidized process system wherein the subdivided solid material is collected in a confined column thereof after contact in one zone and prior to transfer through an adjustable restriction in said column to another zone, the improved method of controlling the circulation of solid material in the system which comprises, measuring the pressure drop of the solid material phase in the column at a level just above the flow restriction therein, further measuring the differential pressure across the adjustable restriction in the column, effecting the continuous incremental adjustment of the circulation rate of the solid material through the adjustable restriction directly responsive to variations in the pressure drop in the phase above the restriction and simultaneously providing in combination therewith a secondary adjustment of said restriction and automatic control of the circulation rate in the system responsive to variations in the differential pressure measurements across the adjustable restriction, and particularly where such measurements are below a predetermined level whereby to insure a descending flow of solid material in a dense phase through the restriction.

The differential pressure across the adjustable flow restricting means, such as a diaphragm operated or hydraulic piston operated slide valve, may readily be obtained by the use of suitable lines connecting from a differential pressure controller to suitably positioned pressure taps above and below the flow restricting means. The differential controller may then readily control and adjust the air supply or hydraulic control means operating the adjustable valve so as to regulate flow through the valve, or where deemed necessary, entirely shut off the flow of solid material through the valve. Various means may be utilized to measure the density or height of the catalyst phase existing above the flow restriction or valve in the transfer line, however, in accordance with the present invention, there may be utilized vertically spaced pressure taps in the transfer line or standpipe having the valve such that the differential pressure between the two pressure taps give an indication of the hydrostatic pressure of the column of the material superimposed above the flow restriction and of the catalyst density or height thereabove. Hydraulically operated slide valves are generally used in connection with fluidized units, however, electric motive power may well be used to operate an adjustable valve in lieu of liquid or air streams under pressure and it is not intended to limit the differential pressure controllers to use in combination with any one motive power supply for the valve.

The present invention and the description herein set forth refers primarily to controlling the circulation rate of a catalyst, however, it is to be pointed out that the invention is not to be limited to use with any one type of material or fluidized system. In other words, the system may apply to any fluidized process, which may be catalytic or non-catalytic and without limitation as to the nature of the subdivided particles or their size. The subdivided particles shall, of course, be of a size sufficiently small to permit ready fluidization by the contacting medium and capable of being handled in conventional particle separating equipment with a minimum of material loss due to attrition or breakage.

One process that may use the improvement to advantage is a fluidized operation in which the contacting in the reaction and/or regeneration steps effects the fluidized contacting of the catalyst particles while the latter are maintained in an upwardly moving state, and with the entire upward flow of particles passing by overhead transfer to a catalyst separating zone, the latter being effective in one or more stages to separate the vaporous or gaseous product streams from the catalyst after contact in the respective reaction and regeneration zone. In each case, the separated catalyst particles are permitted to flow through a standpipe or a descending transfer line having a flow control means prior to entering the next contacting stage.

The term "fluidized system" as used herein refers to a system wherein there are subdivided solid particles suspended in a gaseous or vaporous medium for transfer from one zone to another zone in the system. The term "dense phase" may apply to a moving stream of suspended particles or to a bed of particles maintained in a state of hindered settling as a relatively dense mass, whereas the term "compact phase" or "compact column" as used herein defines a mass of solid particles in contact with a relatively low proportion of fluidizing medium such that the particles are permitted to descend or move in a gravity flow, and little or no fluidizing medium is introduced to the mass of particles. The term "dilute phase" applies to a low density condition where there is a small quantity of solids relative to the quantity of gaseous medium present.

The operation of the present system for regulating the circulation rate of particles in a fluidized system may be better explained by reference to the accompanying drawing and the following description thereof.

FIGURE 1 of the drawing illustrates one embodiment of the control arrangement wherein pressure differential across a control valve provides for adjustments in flow rate directly responsive to the pressure differential.

Figure 2:
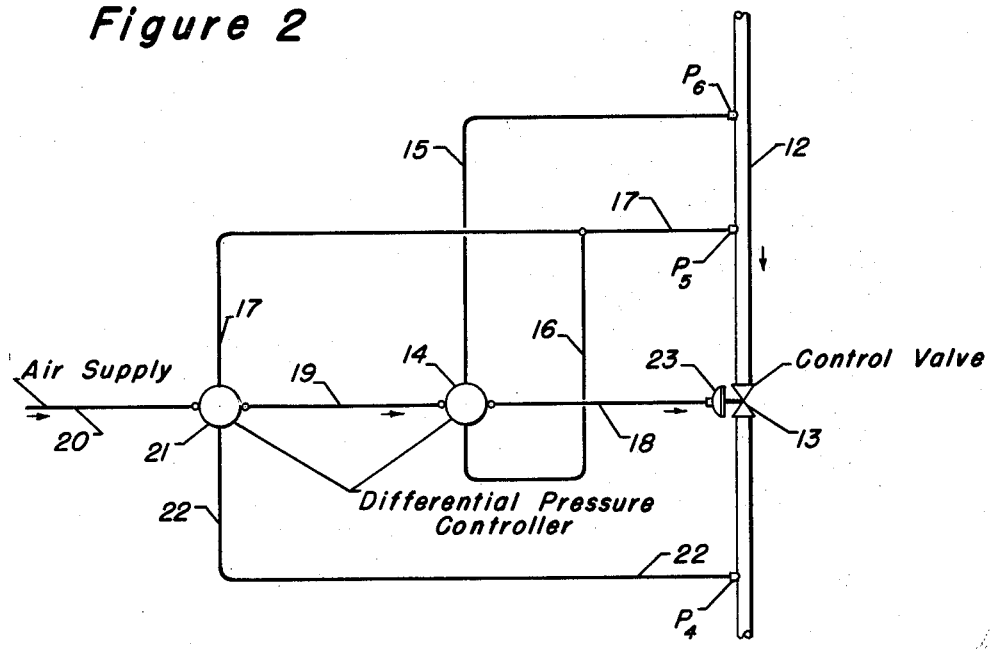

FIGURE 2 of the drawing illustrates a modified embodiment and control arrangement wherein the control valve is adjusted responsive to a pressure differential or varying density existing in the relatively dense compact phase above the zone of the valve.

Referring now to FIGURE 1 of the drawing, there is indicated diagrammatically a catalyst standpipe 1 having a control valve 2 which, in a fluidized particle processing system, is utilized for effecting the downward transfer of subdivided catalyst particles from any one of the contacting zones of the system, such as, for example, the spent catalyst transfer line from a reaction chamber. Pressure taps $P_1$ and $P_2$ are positioned directly below and above valve 2 and connecting with transfer line 1, such that there may be pressure measurements each side of the flow restricting valve 2. Lines 3 and 4 connect the taps with a differential pressure controller 5 so that the latter may automatically note the differential pressure existing across valve 2 and in turn effect the automatic adjustment and control of the valve responsive to the pressure differentials. A line 6 is indicated as connecting between the differential controller 5 and the diaphragm of the control valve 2. It is, however, again pointed out that it is not intended to limit the control arrangement to a diaphragm operated valve or to any one type of control valve. Actually, the control valves used in connection with large transfer lines in fluidized systems are generally of the slide valve type of construction, utilizing air or hydraulic type valve or pistons to effect the automatic adjustment of the slide portion of the valve to in turn regulate the cross sectional area through the valve orifice and the rate of flow therethrough.

The present embodiment indicates an air supply line 7 as connecting to the differential pressure controller 5 whereby air flow may be adjusted and regulated by the latter controller to in turn regulate the flow through line 6 to the adjustable control valve 2. According to the present invention, the air supply to line 6 may be in turn regulated and controlled by a second differential pressure controller 8 which has an air supply line 9 connecting thereto and pressure tap lines 10 and 11 likewise connecting thereto to provide means for noting a differential pressure between two elevated points in the standpipe or transfer line 1. A pressure tap $P_3$ connects with conduit 10 at a spaced distance or elevation above pressure tap $P_2$ such that a pressure differential may be continuously noted between pressure taps $P_2$ and $P_3$ by the controller 8. The pressure line 11 connecting between differential pressure controller 8 and the line 4 provides means for the controller noting the pressure at tap $P_2$, while the line 10 provides means for noting the pressure at the upper pressure tap $P_3$. In other words, the differential pressure controller 8 provides means for reading the differential between $P_2$ and $P_3$ and effecting automatically a measurement of the relative density or height of the catalyst phase existing in the standpipe at a zone just above the control valve 2. As long as the density of the column of catalyst above the control valve 2 is above a predetermined level, i.e., not in a dilute phase which would permit an undesirable quantity of gas or vapor flow downward through the valve, then the differential pressure controller 8 permits the air supply through line 9 to line 7 to be continued or maintained in a substantially unregulated flow and the primary adjustment of the control valve 2 is continued to be effected directly responsive to variations or changes in the differential pressure existing between the pressure tap $P_1$ below the slide valve and $P_2$ located above the slide valve. However, where an upset in the system occurs and the density of the phase above the valve decreases and falls below a predetermined level which would effect a downward movement of a dilute or gaseous phase through valve 2, then the air supply to lines 7 and 6 is cut back by controller 8 and the valve 2 operates to close and slow down particle flow therethrough until the density again builds up in the line 1.

As previously pointed out in connection with fluidized process systems, it is generally conventional to have relatively low pressure differentials existing between adjacent contacting zones such that the differential pressure between the reaction zone and the regeneration zone may be no more than 5 to 10 pounds per square inch, and the pressure at any point in the system no greater than from about 20 to 50 pounds per square inch gauge. Thus, where a low pressure differential exists, it is necessary that there be a close check on the density existing above the slide valve and the assurance that there is sufficient hydrostatic pressure or height in the descending column of material to indicate a dense phase condition that will preclude gas flow downwardly through the control valve.

The present system is of particular advantage over conventional arrangements in that it is unnecessary to depend on the use of a reaction chamber or a storage chamber wherein a dense phase bed is maintained and a level control operated in connection therewith to regulate the circulation rate. In other words, smaller conversion chambers and less catalyst inventory may be maintained in the processing system with a resulting lower capital expense involved in any given unit. In addition, the present system permits the use of a relatively simple and inexpensive instrumentation system which can operate without any fear of reversals of flow of catalyst or of a descending dilute phase gaseous flow through the control valve. Actually, either of the differential pressure controllers 5 or 8 can operate in the present system to control flow of the catalyst and the resulting circulation rate of the system by in turn adjusting the air flow to the adjustment control valve 2 responsive to differential pressures existing between taps $P_1$ and $P_2$ or $P_2$ and $P_3$. The catalyst or solids flow rate is controlled incrementally with the differential pressure across the valve 2 directly reponsive to variations in the pressure at $P_1$ and $P_2$. However, where the solids phase existing above the flow control valve 2 becomes, for one reason or another, less dense or of low height and low resulting hydrostatic pressure, then controller 8 operates in a secondary manner to temporarily reduce the flow and increase the density of the phase above the valve. A minimum pressure differential, as a measurement of density, may be preset into the controller 8 to provide a level for its activation to cut air flow to lines 7 and 6. The drawing indicates the control of an air supply as the means of adjustment, but this is, of course, diagrammatic, in that a liquid flow or an electric power supply may similarly be regulated to in turn adjust the motive power means at the valve 2.

In order to prevent catalyst or other subdivided solid material from entering the pressure lines 3, 4 and 10, as well as the controllers 5 and 8, there may be provided a bleed-in of small quantities of inert gas into the respective lines. Inert gases such as steams or nitrogen may be utilized to advantage, although in some instances a gaseous reactant or product stream will be readily available and desirable for use as a bleed stream. A constant pressure is, of course, necessary for each bleed stream so as to permit the respective controllers to recognize variations in pressure from the different zones of the transfer line 1. Bleed-in arrangements to protect instruments used in connection with processing units are in general useage and it is believed unnecessary to illustrate or describe in detail such provisions for the present control system.

Referring now to FIGURE 2 of the drawing, there is indicated a modified arrangement of the combined integrated control system which utilizes two differential pressure controllers to effect a controlled circulation rate. A transfer line or standpipe 12 is provided with an adjustable control valve 13 and pressure taps $P_4$ and $P_5$ which are located respectively directly below and above the valve 13. Spaced vertically above the upper tap $P_5$ is another pressure tap $P_6$ such that a differential pressure may be measured between points $P_5$ and $P_6$ by means of differential pressure controller 14. The latter connects with $P_6$ by way of line 15 and with $P_5$ by way of lines 16 and 17. The controller 14 also connects with the motive power means of valve 13 by way of control line 18 so as to be capable of automatically adjusting the valve directly responsive to changes in the pressure differential existing between points $P_5$ and $P_6$ in the descending column of catalyst above the valve in standpipe 12. Again, it is pointed out that the present drawing is diagrammatic and that the control valve 13 is indicated as having a diaphragm 23 adjusted by variations in air supply stream through line 18, as regulated by controller 14. The air supply stream is passed through the controller 14 by way of line 19 which in turn is supplied by way of air inlet line 20 and controller 21. Where the control valve 13 is adjustably regulated by means of hydraulic pressure utilizing a liquid medium, then such hydraulic fluid would be varied in a manner similar to the air supply stream indicated in the present drawing. Similarly, with an electric motor operated valve the electric power supply may be regulated to move the motor and valve setting as desired.

The pressure tap $P_4$ connects with a pressure differential controller 21 by line 22 while pressure tap $P_5$ connects with the controller 21 through line 17. Thus, the pressure differential existing above and below the control valve 13 is directly measurable by the pressure differential controller 21 to in turn provide a secondary means of controlling air flow to the control valve 13. In other words, in the present embodiment, the pressure differential between pressure taps $P_5$ and $P_6$, provides a direct control means regulating and moving the control valve 13 responsive to variations in differential. Higher densities or levels in the column of material existing above the valve 13 indicated by high differential between taps $P_5$ and $P_6$ causes the controller 14 to open the control valve 13 and to increase the flow therethrough and the resulting circulation rate in the system. At the same time, the differential pressure controller 21 is adjusted such that a pressure differential between pressure taps $P_4$ and $P_5$ less than a predetermined amount will cause the regulation of air flow through line 20 to line 19 and to the control valve 13 to bring about a closing of the valve so as to preclude a reversal of flow in the standpipe 12.

The system, as embodied in FIGURE 2, is likewise of advantage in that it provides for regulating the rate of particle circulation in an automatic arrangement which permits a simplified fluidized system without the necessity of maintaining a fluidized bed of particles in any one chamber and level control means in conjunction with such bed to in turn control flow. At the same time, the system, by virtue of the series connection of the controllers to the air supply line, or other motive power supply means, provides primary and secondary flow control to insure that there is an incremental adjustment in the circulation rate of the solid material directly responsive to slight changes in pressure differential in any one catalyst stand-pipe, together with a secondary means for precluding undesirable downward dilute phase or gaseous flows or any dangerous reversals of flow of catalyst.

We claim as our invention:

1. In a processing system wherein subdivided solid material is continuously circulated from a first contacting zone to a second contacting zone and from the latter zone to the first zone and wherein said subdivided material is collected in a relatively compact phase in a confined column after contact in the first zone and prior to transfer through an adjustable restriction in said column to the second zone, the improved method of controlling the circulation rate of the solid material in the system which comprises measuring variations in the pressure differential of the solid material phase existing just above said restriction, measuring the pressure differential across said restriction, and continuously controlling and adjusting the flow of solid material through said system responsive to the combination of both said pressure differential measurement occurring across said restriction and to said pressure differential measurement above said restriction.

2. In a processing system wherein subdivided solid material is continuously circulated from a first contacting zone to a second contacting zone and from the latter zone to the first zone and wherein said subdivided material is collected in a relatively compact phase in a confined column after contact in the first zone and prior to transfer through an adjustable restriction in said column to the second zone, the improved method of controlling the circulation rate of the solid material in the system which comprises, measuring the density of the solid material phase at a level just above the flow restriction, further measuring the differential pressure across said restriction in said column, effecting the continuous adjustment of the circulation rate of said material through said adjustable restriction directly responsive to variations in pressure differential thereacross and simultaneously providing in combination therewith a secondary automatic control and adjustment of said adjustable restriction and in the circulation rate responsive to a measurement of density in said phase above said restriction, whereby to insure a descending flow of solid material in a dense phase through said restriction.

3. The improved method of control of claim 2 further characterized in that the measurement of the density of the solid material phase at a level above the flow restriction is effected by measuring the differential pressure between spaced points in said column.

4. In a processing system wherein subdivided solid material is continuously circulated from a first contacting zone to a second contacting zone and from the latter zone to the first zone and wherein said subdivided material is collected in a relatively compact phase in a confined column after contact in the first zone and prior to transfer through an adjustable restriction in said column to the second zone, the improved method of controlling the circulation rate of the solid material in the system which comprises, measuring the differential pressure of the solid material phase at a level just above the flow restriction, further measuring the differential pressure across said adjustable restriction in said column, effecting the continuous adjustment of the circulation rate of solid material through said adjustable restriction directly responsive to varying pressure differential above said restriction, and simultaneously providing in combination therewith a secondary automatic control and adjustment of said variable restriction and the circulation rate responsive to a variation in the differential pressure measurement across said restriction, whereby to insure a descending flow of solid material in a dense phase through said restriction.

5. The improved method of control of claim 4 further characterized in that the measurement of the differential pressure of the solid material phase at a level above the flow restriction is effected by measuring the differential pressure between spaced points in said column.

6. A flow regulating system for subdivided solid particles descending through a transfer conduit, which comprises in combination, an adjustable flow restricting means within said conduit, motive power means connecting with said restricting means and providing automatic adjustment thereof, a pressure tap connecting with said conduit below said restricting means, a pair of spaced apart pressure taps connecting with said conduit at points above said restricting means, suitable pressure lines connecting said pair of pressure taps with a differential pressure controller, said pressure tap below said restricting means and the lower pressure tap of said pair above said restricting means connecting through pressure lines with a secondary differential pressure controller, and each of said differential pressure controllers connecting in a series manner with the motive power means connecting with said adjustable flow restricting means, whereby the latter is automatically adjusted to both the independent and combined control actions of said controllers.

7. The flow regulating system of claim 6 further characterized in that the first said differential pressure controller connects directly with said motive power means in turn connecting with said adjustable restricting means and second said differential controller connects with the motive power supply means ahead of the latter's connection with said first differential pressure controller, whereby the motive power means is controlled by both of said differential controllers.

8. The flow regulating system of claim 6 further characterized in that second said differential pressure controller connects directly with the motive power means connecting with said adjustable restricting means and first said differential pressure controller connects with the motive power supply means ahead of second said differential controller whereby the motive power means is controlled by both of said differential controllers.

References Cited in the file of this patent

UNITED STATES PATENTS

| | | |
|---|---|---|
| 2,601,676 | Trainer et al. | Mar. 10, 1950 |
| 2,727,792 | Bearer | Dec. 20, 1955 |
| 2,860,174 | Begley | Nov. 11, 1958 |
| 2,905,538 | McIntire | Sept. 22, 1959 |
| 2,909,413 | Hildyard | Oct. 20, 1959 |